(12) United States Patent
Hisada et al.

(10) Patent No.: US 8,955,909 B2
(45) Date of Patent: Feb. 17, 2015

(54) VEHICLE

(75) Inventors: Kazumasa Hisada, Akashi (JP);
Teruaki Yamamoto, Kakogawa (JP)

(73) Assignee: Kawasaki Jukogyo Kabushiki Kaisha, Hyogo (JP)

(*) Notice: Subject to any disclaimer, the term of this patent is extended or adjusted under 35 U.S.C. 154(b) by 453 days.

(21) Appl. No.: 13/340,863

(22) Filed: Dec. 30, 2011

(65) Prior Publication Data

US 2013/0169019 A1    Jul. 4, 2013

(51) Int. Cl.
*B60N 2/005* (2006.01)
*B60N 2/01* (2006.01)
*B60N 2/38* (2006.01)

(52) U.S. Cl.
USPC ........ 297/232; 297/233; 297/248; 297/440.1; 297/440.14; 297/440.15; 297/440.2; 297/440.22

(58) Field of Classification Search
USPC ............... 297/440.1, 440.13, 440.22, 195.13, 297/223, 228.13, 229, 440.11, 248, 232, 297/233, 440.15, 440.2, 440.14
See application file for complete search history.

(56) References Cited

U.S. PATENT DOCUMENTS

| | | | | |
|---|---|---|---|---|
| 151,411 A * | 5/1874 | Marshall | ......................... | 297/236 |
| 1,039,780 A * | 10/1912 | Morgan | ............................. | 296/64 |
| 1,315,031 A * | 9/1919 | Munro | ............................. | 297/64 |
| 2,137,312 A * | 11/1938 | Thompson | .................... | 297/252 |
| 2,678,680 A * | 5/1954 | Haltenberger | ................ | 297/383 |
| 2,766,815 A * | 10/1956 | Brooks et al. | ................. | 297/232 |
| 2,839,312 A * | 6/1958 | Barenyi et al. | ................ | 280/775 |
| 2,966,203 A * | 12/1960 | Foulkes | ......................... | 297/115 |
| 3,323,835 A * | 6/1967 | Barecki | ........................ | 297/451.1 |
| 3,528,096 A * | 9/1970 | Moberg | ......................... | 297/130 |
| 3,600,036 A * | 8/1971 | Iskander | ........................ | 297/239 |
| 3,619,004 A * | 11/1971 | McKernan et al. | ........... | 297/248 |
| 3,635,521 A * | 1/1972 | Shivvers | ........................ | 297/125 |
| 3,638,997 A * | 2/1972 | Shapiro et al. | ................ | 297/232 |
| 3,873,155 A * | 3/1975 | Barecki | ........................ | 297/451.4 |
| 3,896,531 A * | 7/1975 | Gorman | ......................... | 29/91.1 |
| 4,027,888 A * | 6/1977 | Wilcox | ..................... | 297/452.17 |
| RE29,522 E * | 1/1978 | Barecki | ........................ | 297/451.4 |
| 4,077,667 A * | 3/1978 | Allerheiligen | ............. | 297/450.1 |
| 4,382,628 A * | 5/1983 | Palmgren | ....................... | 297/232 |
| 4,438,603 A * | 3/1984 | Durkan, Jr. | ........................ | 52/8 |
| 4,657,302 A * | 4/1987 | Snyder | ......................... | 297/232 |
| 4,848,843 A * | 7/1989 | Gibbs | ...................... | 297/440.22 |
| 5,102,191 A * | 4/1992 | Peng | ........................... | 297/218.5 |
| 5,306,072 A * | 4/1994 | Caldwell | ....................... | 297/232 |
| 5,378,045 A * | 1/1995 | Siekman et al. | ......... | 297/452.25 |
| 5,890,761 A * | 4/1999 | Miller | ............................ | 297/232 |
| 5,915,785 A * | 6/1999 | Walker | ....................... | 297/217.7 |
| 5,930,886 A * | 8/1999 | Jovan et al. | ..................... | 29/469 |
| 6,109,686 A * | 8/2000 | Fox | ............................... | 297/105 |

(Continued)

*Primary Examiner* — Rodney B White
(74) *Attorney, Agent, or Firm* — Wenderoth, Lind & Ponack, L.L.P.

(57) ABSTRACT

A vehicle has a seat on which a passenger sits, wherein the seat is bench-shaped and has a sitting portion, a backrest portion, and a supporting portion which supports the sitting portion and the backrest portion, wherein at least one of the sitting portion and the backrest portion is detachable from the supporting portion, wherein when the sitting portion is detachable, the sitting portion has a plurality of sitting regions which are arranged side by side in the right-left direction and have different thicknesses in the up-down direction, and wherein when the backrest portion is detachable, the backrest portion has a plurality of backrest regions which are arranged side by side in the right-left direction and have different thicknesses in the front-rear direction.

3 Claims, 8 Drawing Sheets

(56) References Cited

U.S. PATENT DOCUMENTS

| | | |
|---|---|---|
| 6,203,105 B1 * | 3/2001 | Rhodes, Jr. .............. 297/284.6 |
| 6,533,361 B1 * | 3/2003 | Pietrzak ................. 297/440.22 |
| 6,637,823 B1 * | 10/2003 | Ursini et al. ............ 297/440.2 |
| 6,820,932 B2 * | 11/2004 | Misthos et al. ............. 297/232 |
| 6,905,159 B1 | 6/2005 | Saito et al. |
| 6,994,388 B2 | 2/2006 | Saito et al. |
| 7,077,474 B2 * | 7/2006 | Satani ....................... 297/236 |
| 7,121,623 B2 * | 10/2006 | Fujihara et al. ............. 297/243 |
| 7,249,798 B2 | 7/2007 | Saito et al. |
| 7,562,934 B2 * | 7/2009 | Swan et al. ................. 297/233 |
| 7,651,162 B2 * | 1/2010 | Segato ..................... 297/195.1 |
| 7,963,613 B2 * | 6/2011 | Felmeri ................... 297/440.22 |
| 8,002,350 B2 * | 8/2011 | Johnson ..................... 297/248 |
| 8,123,296 B2 * | 2/2012 | Rager et al. ............... 297/284.3 |
| 8,162,396 B2 * | 4/2012 | Edwards ................... 297/233 |
| 8,191,966 B1 * | 6/2012 | Longenette ............... 297/228.1 |
| 8,672,387 B1 * | 3/2014 | Kaku et al. ................ 296/65.05 |
| 2001/0022462 A1 * | 9/2001 | Kawamoto et al. ...... 297/440.22 |
| 2002/0195847 A1 * | 12/2002 | Hsu ........................... 297/232 |
| 2006/0250004 A1 * | 11/2006 | Jones ......................... 297/229 |
| 2008/0224511 A1 * | 9/2008 | Herkenrath et al. ......... 297/248 |
| 2010/0084898 A1 * | 4/2010 | Koh ........................... 297/232 |

\* cited by examiner

VEHICLE

BACKGROUND OF THE INVENTION

1. Field of the Invention

The present invention relates to a vehicle having a seat on which a passenger sits.

2. Description of the Related Art

Some utility vehicles used for various applications, such as leisure wagons for hunting and working trucks for agriculture, have a bench-shaped seat. The present inventors have filed inventions related to utility vehicles having a bench seat, and their applications have been registered. For instance, there are U.S. Pat. Nos. 6,905,159, 6,994,388, and 7,249,798. In utility vehicles having such a seat, it is difficult to change the height of a sitting portion and the position in the front-rear direction of a backrest portion so as to be adapted for passengers having different body sizes.

SUMMARY OF THE INVENTION

The present invention has been made in view of the above problems, and an object of the present invention is to allow the bench-shaped seat of a vehicle to change the height of a sitting portion and the position in the front-rear direction of a backrest portion.

To achieve the above object, the present invention provides a vehicle having a seat on which a passenger sits, wherein the seat is bench-shaped and has a sitting portion, a backrest portion, and a supporting portion which supports the sitting portion and the backrest portion, wherein at least one of the sitting portion and the backrest portion is detachable from the supporting portion, wherein when the sitting portion is detachable, the sitting portion has a plurality of sitting regions which are arranged side by side in the right-left direction and have different thicknesses in the up-down direction, wherein when the backrest portion is detachable, the backrest portion has a plurality of backrest regions which are arranged side by side in the right-left direction and have different thicknesses in the front-rear direction.

With the above configuration, a detachable sitting portion has a plurality of sitting regions which are arranged side by side in the right-left direction and have different thicknesses in the up-down direction or a detachable backrest portion has a plurality of backrest regions which are arranged side by side in the right-left direction and have different thicknesses in the front-rear direction, so that the sitting portion is attached so as to be reversed in the right-left direction, thereby enabling the height of the sitting portion to be changed and that the backrest portion is attached so as to be reversed in the right-left direction, thereby enabling the position in the front-rear direction of the backrest portion to be changed.

(1) In the present invention, preferably, when the sitting portion is detachable, the sitting portion can be attached to the supporting portion so as to be reversed in the right-left direction while being maintained in the up-down direction, and when the backrest portion is detachable, the backrest portion can be attached to the supporting portion so as to be reversed in the right-left direction while being maintained in the front-rear direction.

The configuration (1) is the specific attaching configuration of the detachable sitting portion and the detachable backrest portion to the supporting portion, and with the configuration (1), the sitting portion and the backrest portion can be attached to the supporting portion so as to be easily reversed in the right-left direction.

(2) In the configuration (1), preferably, the detachable sitting portion has three sitting regions, the thickness of the sitting region in the middle portion in the right-left direction is formed to be larger than the thicknesses of other sitting regions, and the thickness of the sitting region at one end in the right-left direction is formed to be larger than the thickness of the sitting region at the other end in the right-left direction.

The configuration (2) is a specific configuration in which three persons can sit on the bench seat, and the thickness of the sitting region in the middle portion in the right-left direction is larger than the thicknesses of other sitting regions, so that the three sitting regions can be easily sectioned. In addition, the thickness of the sitting region at one end in the right-left direction is larger than the thickness of the sitting region at the other end in the right-left direction, so that the sitting portion is attached to the supporting portion so as to be reversed in the right-left direction, thereby enabling the thicknesses of the sitting regions at both ends in the right-left direction to be changed.

(3) With the configuration (1), preferably, the detachable backrest portion has three backrest regions, the thickness of the backrest region in the middle portion in the right-left direction is formed to be larger than the thicknesses of other backrest regions, and the thickness of the backrest region at one end in the right-left direction is formed to be larger than the thickness of the backrest region at the other end in the right-left direction.

The configuration (3) is a specific configuration in which three persons can sit on the bench seat, and the thickness of the backrest region in the middle portion in the right-left direction is larger than the thicknesses of other backrest regions, so that the three backrest regions can be easily sectioned. In addition, the thickness of the backrest region at one end in the right-left direction is larger than the thickness of the backrest region at the other end in the right-left direction, so that the backrest portion is attached to the supporting portion so as to be reversed in the right-left direction, thereby enabling the thicknesses of the backrest regions at both ends in the right-left direction to be changed.

(4) With the configuration (1), the detachable backrest portion is formed so that the thickness of the backrest portion is different in the up-down direction.

With the configuration (4), the backrest portion is attached to the supporting portion so as to be reversed in the right-left direction, so that the inclination angle of the backrest portion can be changed.

DETAILED DESCRIPTION OF THE INVENTION

Figure 1:
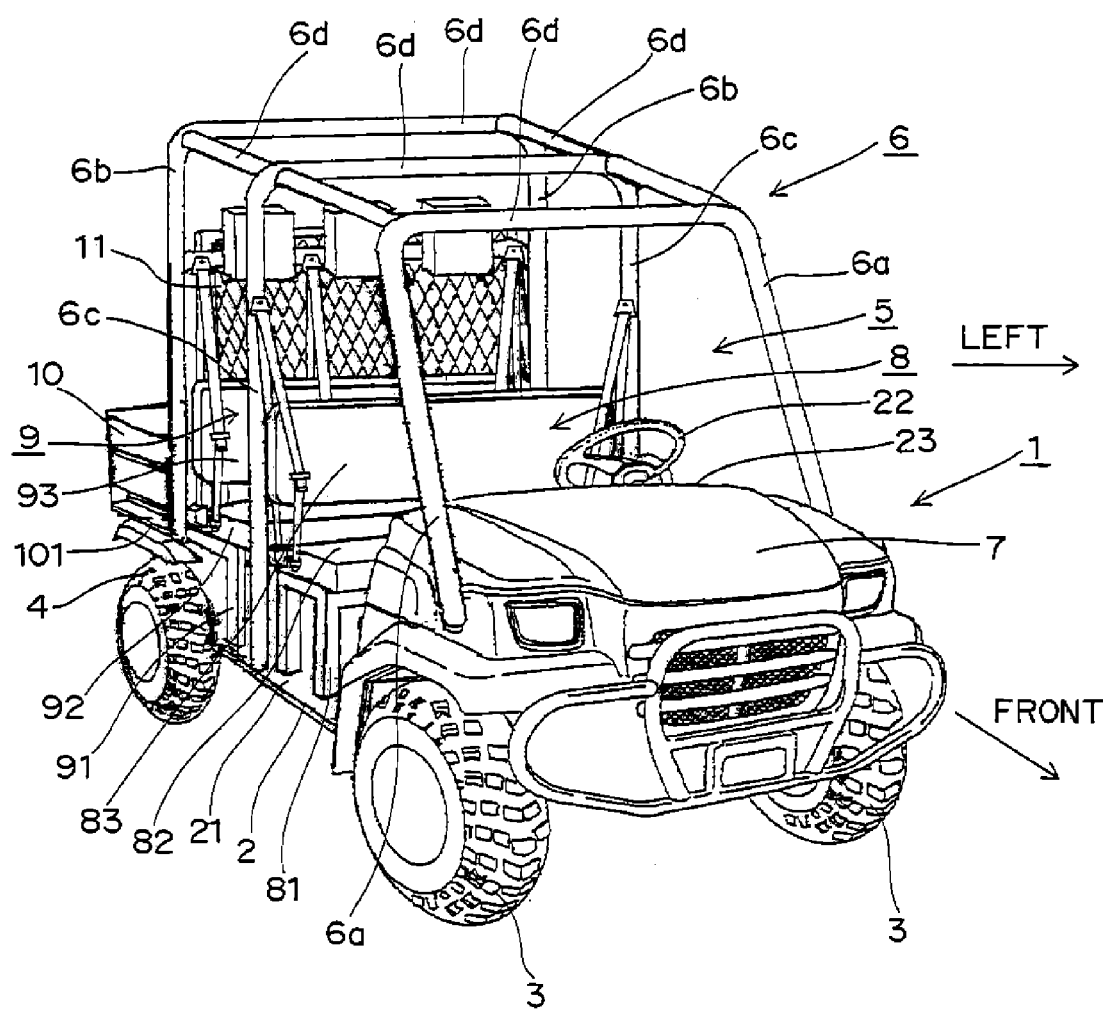
FIG. 1 is a perspective view of a utility vehicle according to the present invention.

FIG. 1 is a perspective view of a utility vehicle according to the present invention. The concept of the directions used in this embodiment will be described as coinciding with the concept of the directions seen from the driver of the utility vehicle.

As shown in FIG. 1, a utility vehicle 1 has a vehicle body 2 supported by a pair of right and left front wheels 3 and a pair of right and left rear wheels 4, and is provided with a ROPS 6 configuring a riding space (cabin) 5 in the intermediate portion in the front-rear direction on the vehicle body 2. And, a hood 7 is provided in front of the cabin 5, and a cargo bed 10 is provided to the rear of the cabin 5. Further, a screen shield 11 which partitions the cargo bed 10 and the cabin 5 is provided at the front end of the cargo bed 10.

The ROPS 6 is abbreviated for rollover protective structure, and has a pair of right and left front vertical members 6a, a pair of right and left rear vertical members 6b, a pair of right and left intermediate vertical members 6c arranged between the front vertical members 6a and the rear vertical members 6b, and a plurality of upper end beam members 6d which couple the upper ends of the vertical members 6a, 6b, and 6c. And, the lower portions of the front vertical members 6a are attached to near the right and left side portions of the hood 7, and the lower portions of the rear vertical members 6b are attached to the right and left side portions of a floor plate 101 of the cargo bed 10. In addition, the lower portions of the intermediate vertical members 6c are attached to the right and left side portions of a floor surface 21 of the vehicle body 2.

A bench-shaped front seat 8 is provided in the front half portion in the cabin 5, a bench-shaped rear seat 9 is provided in the rear half portion in the cabin 5, and a dashboard (operating portion) 23 having a steering wheel 22 is provided at the front end of the cabin 5.

The bench-shaped front seat 8 has a supporting portion 81 provided on the floor surface 21 of the vehicle body 2, a sitting portion 82 attached to the upper surface in the front portion of the supporting portion 81, and a backrest portion 83 attached to the front surface in the rear portion of the supporting portion 81. The front seat 8 extends in the right-left direction to near the right and left ends of the cabin, and with this, a plurality of persons can sit thereon side by side in the right-left direction.

The bench-shaped rear seat 9 is provided on the floor surface 21 of the vehicle body 2, and has a supporting portion 91 which accommodates an engine (not shown), a sitting portion 92 attached to the upper surface in the front portion of the supporting portion 91, and a backrest portion 93 attached to the front surface in the rear portion of the supporting portion 91. Like the front seat 8, the rear seat 9 extends in the right-left direction to near the right and left ends of the cabin, and with this, a plurality of persons can sit thereon side by side in the right-left direction.

Hereinafter, the configuration of the front seat 8 will be described in more detail, and the rear seat 9 also has the same configuration as the front seat 8.

Figure 2:
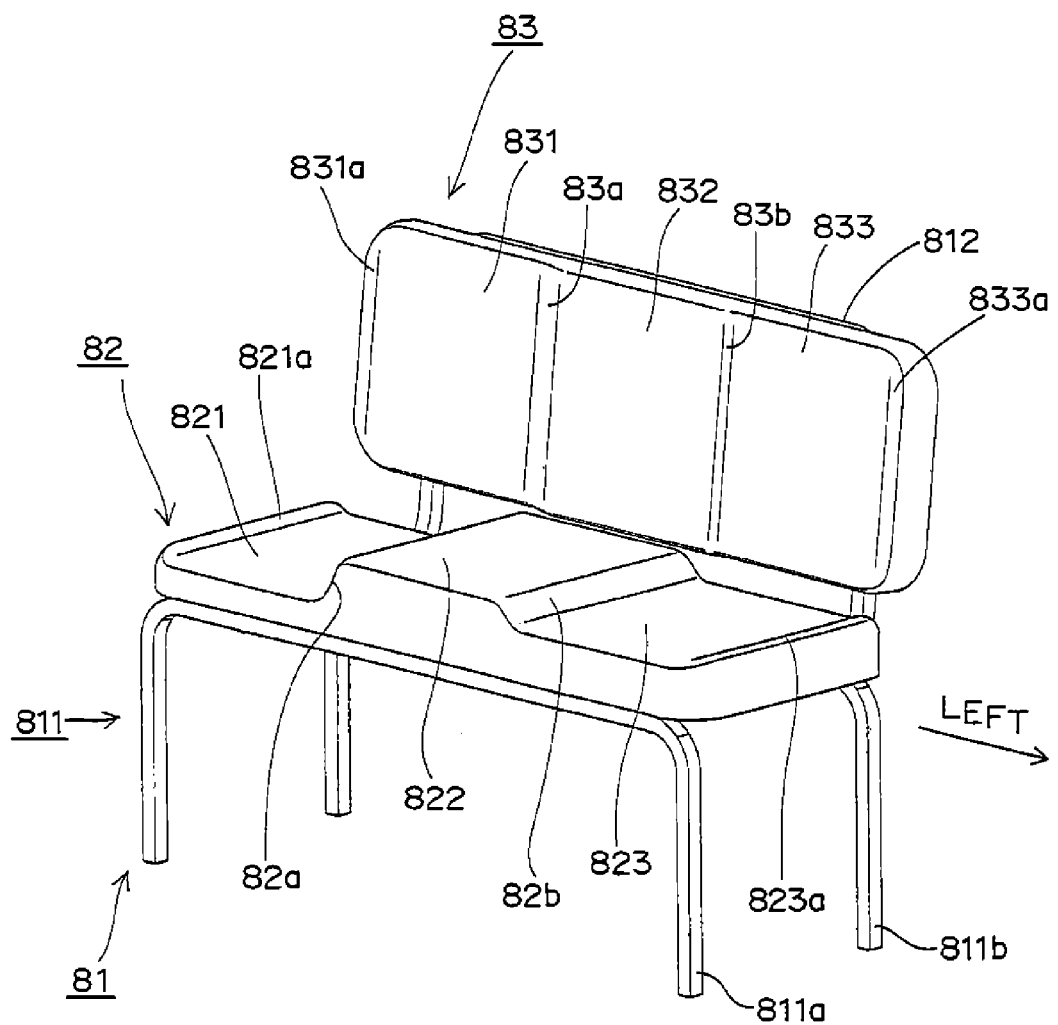
FIG. 2 is a front perspective view of a front seat.

FIG. 2 is a front perspective view of the front seat 8. As shown in FIG. 2, the sitting portion 82 has three sitting regions in the right-left direction, and the thickness of a second sitting region 822 in the middle thereof is larger than the thicknesses of a first sitting region 821 and a third sitting region 823 in the right and left side portions. Further, the thickness of the third sitting region 823 on the left side is larger than the thickness of the first sitting region 821 on the right side. Therefore, with respect to the height in the up-down direction of the sitting portion 82, the second sitting region 822 in the middle, the third sitting region 823 on the left side, and the first sitting region 821 on the right side are located in decreasing order of height. At the boundary between the first sitting region 821 and the second sitting region 822, an inclining portion 82a in which the upper surface of the sitting portion 82 inclines upward toward the middle in the right-left direction is formed, and at the boundary between the second sitting region 822 and the third sitting region 823, an inclining portion 82b in which the upper surface of the sitting portion 82 inclines upward toward the middle in the right-left direction is formed. In addition, a projecting portion 821a which projects upward is formed at the right end of the first sitting region 821, and a projecting portion 823a which projects upward is formed at the left end of the third sitting region 823.

The backrest portion 83 has three backrest regions in the right-left direction, and the thickness of a second backrest region 832 in the middle thereof is larger than the thicknesses of a first backrest region 831 and a third backrest region 833 in the right and left side portions. Further, the thickness of the third backrest region 833 on the left side is larger than the thickness of the first backrest region 831 on the right side. Therefore, with respect to the position in the front-rear direction at the front end of the backrest portion 83, the second backrest region 832 in the middle, the third backrest region 833 on the left side, and the first backrest region 831 on the right side are located from the front in that order. At the boundary between the first backrest region 831 and the second backrest region 832, an inclining portion 83a in which the front surface of the backrest portion 83 inclines forward toward the middle in the right-left direction is formed, and at the boundary between the second backrest region 832 and the third backrest region 833, an inclining portion 83b in which the front surface of the backrest portion 83 inclines forward toward the middle in the right-left direction is formed. In addition, a projecting portion 831a which projects forward is formed at the right end of the first backrest region 831, and a projecting portion 833a which projects forward is formed at the left end of the third backrest region 833.

Figure 3:
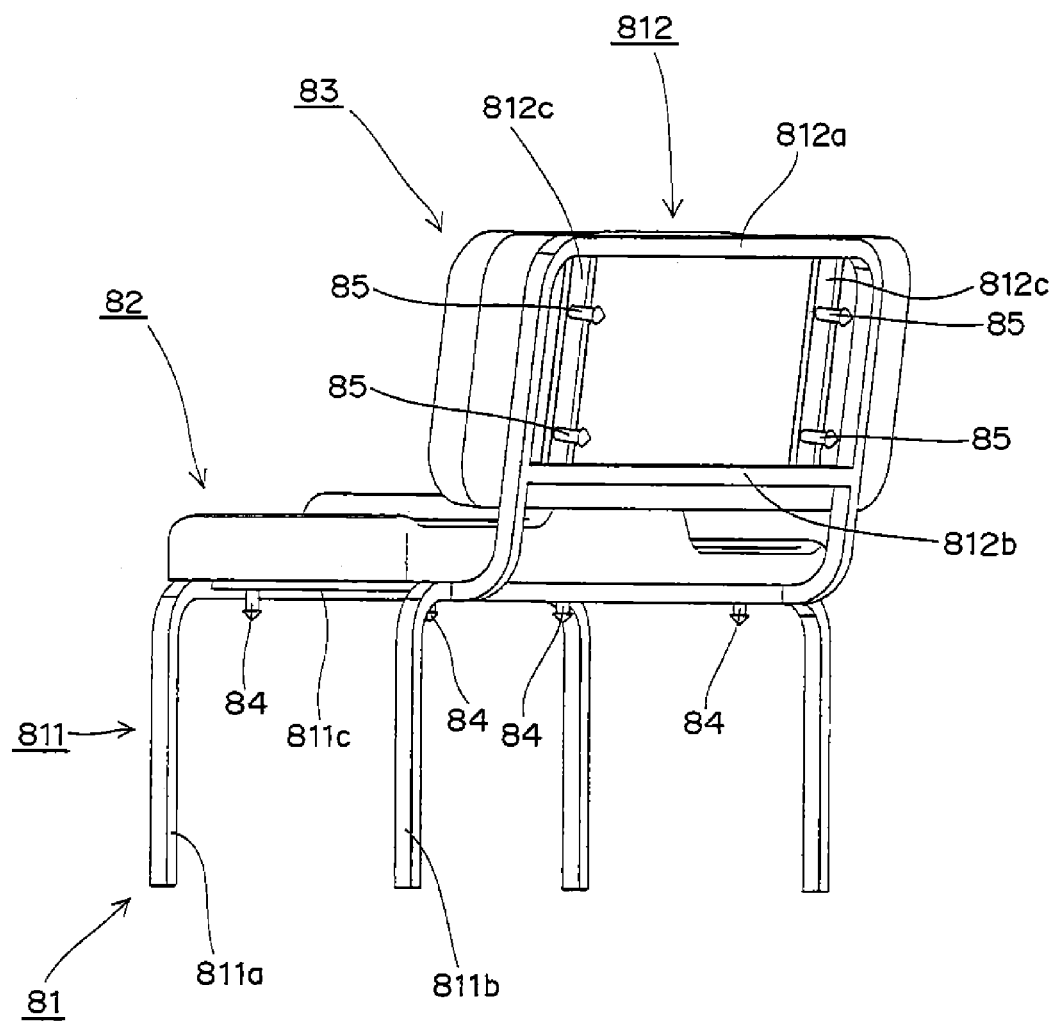
FIG. 3 is a rear perspective view of the front seat.

FIG. 3 is a rear perspective view of the front seat 8. As shown in FIG. 3, the supporting portion 81 has a sitting supporting portion 811 which supports the sitting portion 82, and a backrest supporting portion 812 which supports the backrest portion 83. The sitting supporting portion 811 has a front leg portion 811a and a rear leg portion 811b formed in an inverted U shape, and coupling portions 811c which couple the front leg portion 811a and the rear leg portion 811b in the front-rear direction.

The backrest supporting portion 812 is coupled to the rear leg portion 811b, extends substantially upward from the rear leg portion 811b, and has a U-shaped forming portion 812a which forms an outer frame, a horizontal coupling portion 812b which couples the right and left sides of the U-shaped forming portion 812a, and vertical coupling portions 812c which couple the U-shaped forming portion 812a and the horizontal coupling portion 812b in the up-down direction.

Figure 4:
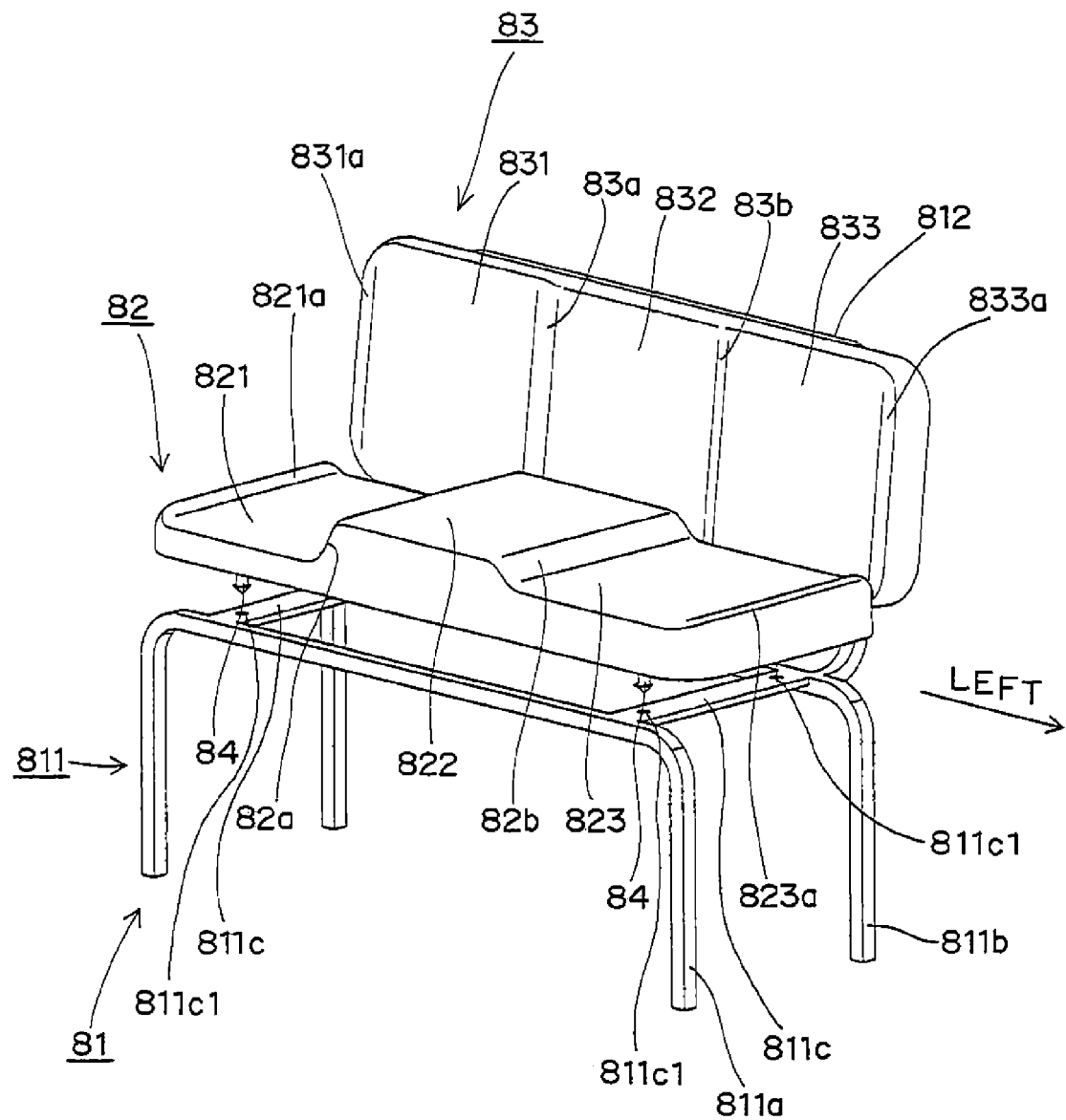
FIG. 4 is a front perspective view of the front seat showing the state that a sitting portion is detached.
Figure 5:
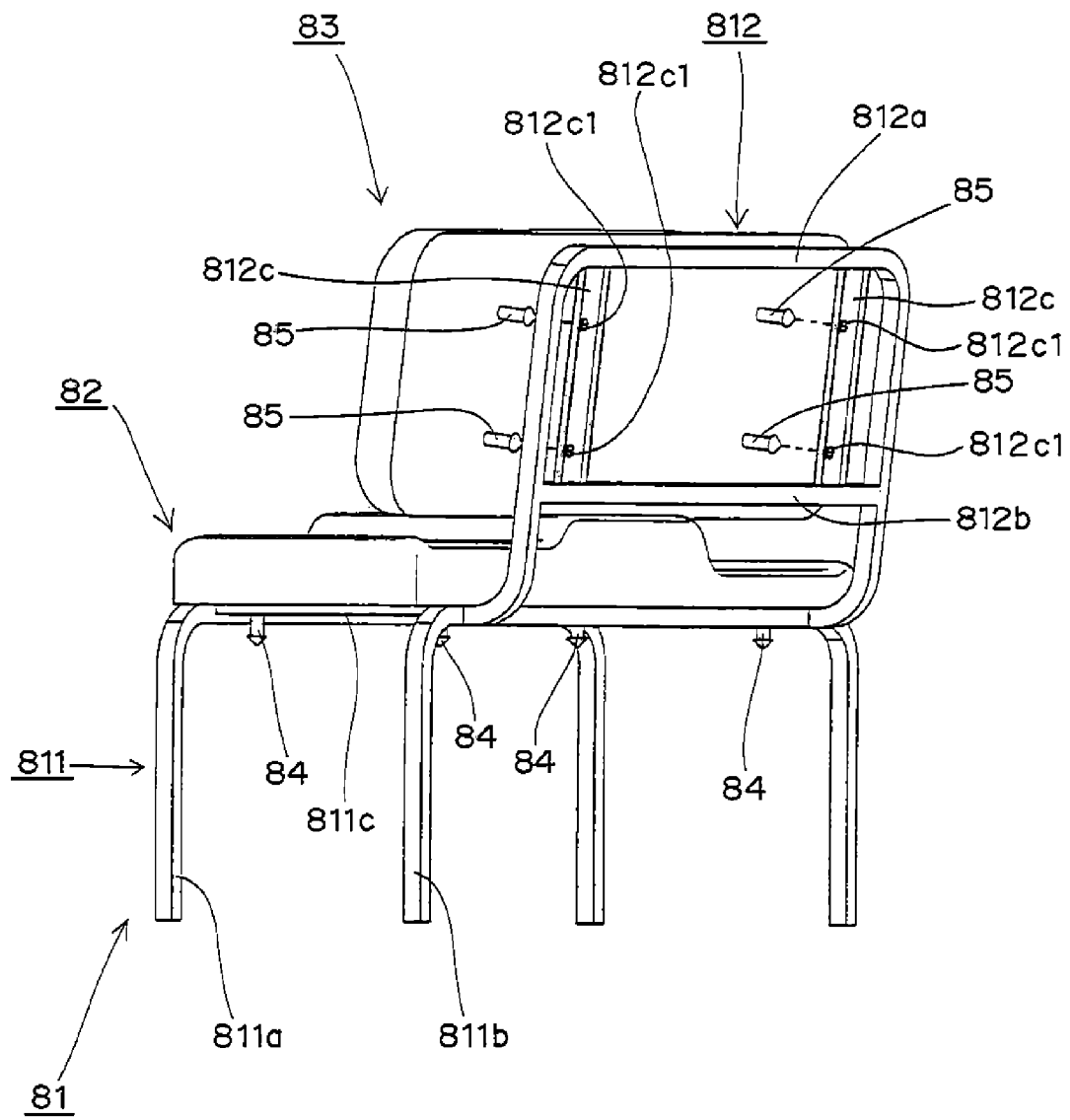
FIG. 5 is a rear perspective view of the front seat showing the state that a backrest portion is detached.

FIG. 4 is a front perspective view of the front seat 8 showing the state that the sitting portion 82 is detached, and FIG. 5 is a rear perspective view of the front seat 8 showing the state that the backrest portion 83 is detached. As shown in FIG. 4, a plurality of projecting members 84 (attaching portions) are attached to the lower surface of the sitting portion 82. Further, the projecting members 84 may be formed integrally with the lower surface of the sitting portion 82. In addition, holes 811c1 are formed in the coupling portions 811c of the supporting portion 81. And, the sitting portion 82 is attached to the supporting portion 81 by inserting the projecting members 84 through the holes 811c1.

Figure 6:
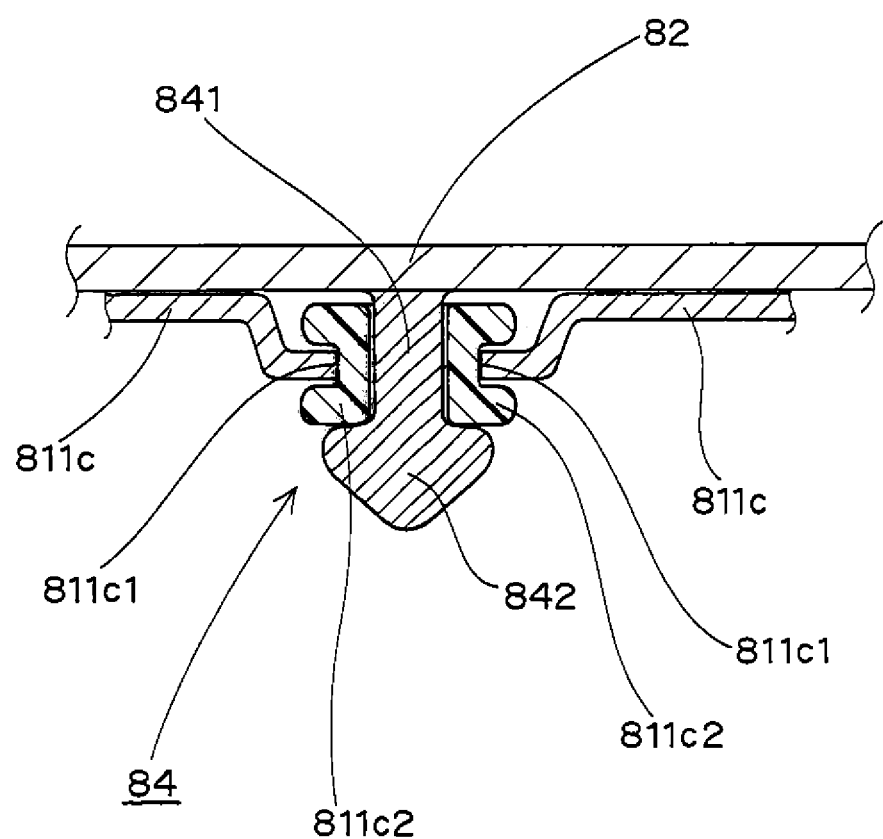
FIG. 6 is a longitudinal sectional view showing the state that a projecting member is inserted through a hole.

FIG. 6 is a longitudinal sectional view showing the state that the projecting member 84 is inserted through the hole 811c1. As shown in FIG. 6, the projecting member 84 has a shaft portion 841 and a distal end 842. The distal end 842 has a substantially conical shape in which its diameter is larger on the shaft portion 841 side than the shaft portion 841 and is smaller toward its end. And, a resilient member 811c2 is attached to around the hole 811c1. As a result, the projecting member 84 is removable from the hole 811c1, and in the state that the projecting member 84 is inserted into the hole 811c1, the shaft portion 841 is supported by the resilient member 811c2. Therefore, the sitting portion 82 is detachable from the supporting portion 81.

As shown in FIG. 5, a plurality of projecting members 85 (attaching portions) are attached to the rear surface of the backrest portion 83. (The projecting members 85 may be formed integrally with the lower surface of the backrest portion 83.) In addition, holes 812c1 are formed in the vertical coupling portions 812c of the supporting portion 81. And, the backrest portion 83 is attached to the supporting portion 81 by inserting the projecting members 85 through the holes 812c1. The engaging configuration of the projecting members 85 and the vertical coupling portions 812c is the same as that of the projecting members 84 and the coupling portions 811c, and therefore, the backrest portion 83 is detachable from the supporting portion 81.

Figure 7:
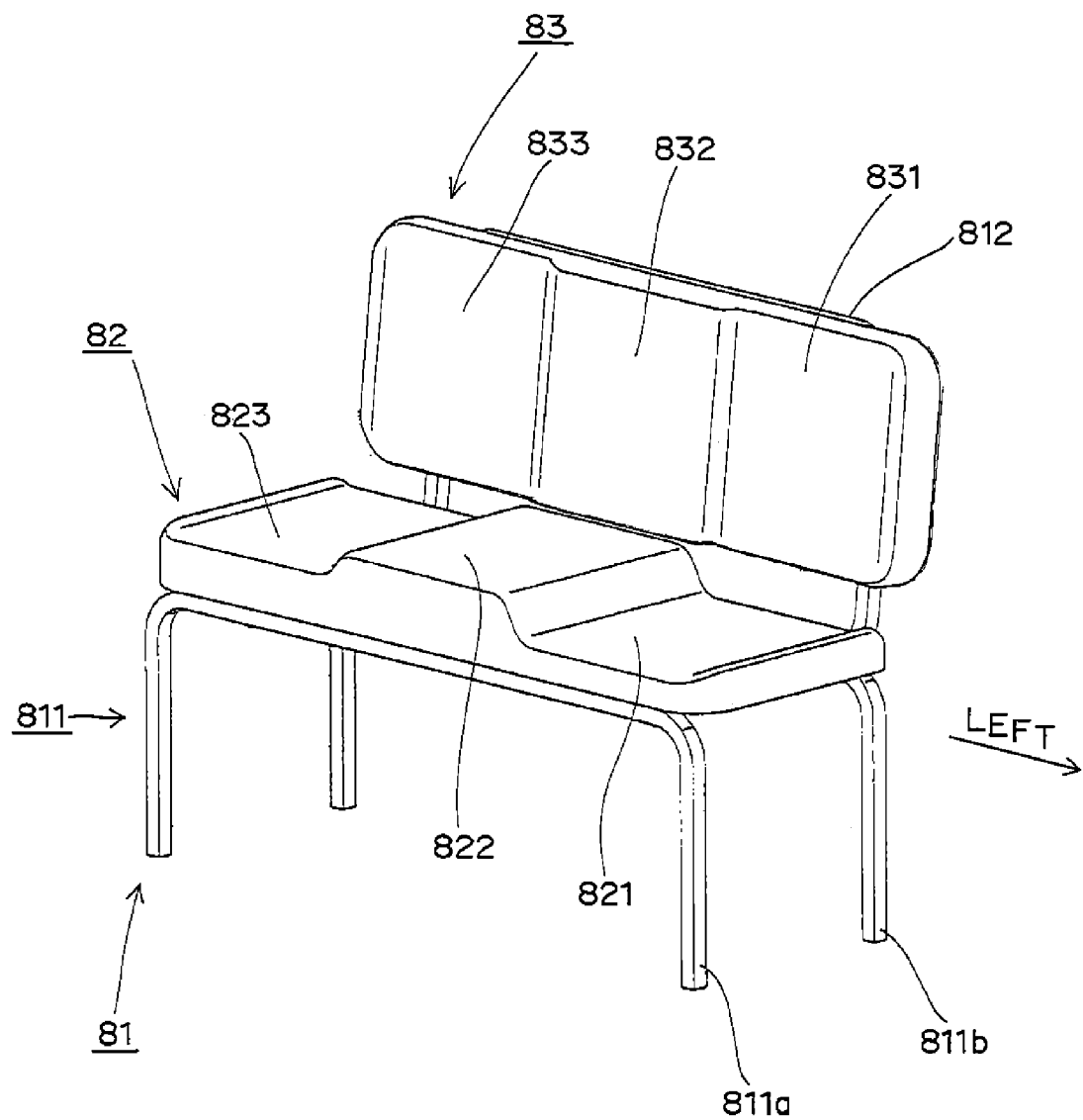
FIG. 7 is a front perspective view showing the state that the sitting portion of FIG. 2 is attached to a supporting portion so as to be reversed in the right-left direction while being maintained in the up-down direction and that the backrest portion of FIG. 2 is attached to the supporting portion so as to be reversed in the right-left direction while being maintained in the front-rear direction.

FIG. 7 is a front perspective view showing the state that the sitting portion 82 of FIG. 2 is attached to the supporting portion 81 so as to be reversed in the right-left direction while being maintained in the up-down direction and that the backrest portion 83 of FIG. 2 is attached to the supporting portion 81 so as to be reversed in the right-left direction while being maintained in the front-rear direction. As a result, the third sitting region 823 located on the left side in FIG. 2 is located on the right side in FIG. 7, and the first sitting region 821 located on the right side in FIG. 2 is located on the left side in FIG. 7. Therefore, with respect to the height in the up-down direction of the sitting portion 82, the second sitting region 822 in the middle, the third sitting region 823 on the right side, and the first sitting region 821 on the left side are located in decreasing order of height. In other words, with respect to the state of FIG. 2, in FIG. 7, the height in the up-down direction on the right side of the sitting portion 82 is increased, and the height in the up-down direction on the left side of the sitting portion 82 is decreased.

Likewise, when the backrest portion 83 of FIG. 2 is attached to the supporting portion 81 so as to be reversed in the right-left direction while being maintained in the front-rear direction, the third backrest region 833 located on the left side in FIG. 2 is located on the right side in FIG. 7, and the first backrest region 831 located on the right side in FIG. 2 is located on the left side in FIG. 7. Therefore, with respect to the position in the front-rear direction at the front end of the backrest portion 83, the second backrest region 832 in the middle, the third backrest region 833 on the right side, and the first backrest region 831 on the left side are located from the front in that order. In other words, with respect to the state of FIG. 2, the position in the front-rear direction at the front end on the right side of the backrest portion 83 is on the front side, and the position in the front-rear direction at the front end on the left side of the backrest portion 83 is on the rear side.

Figure 8:
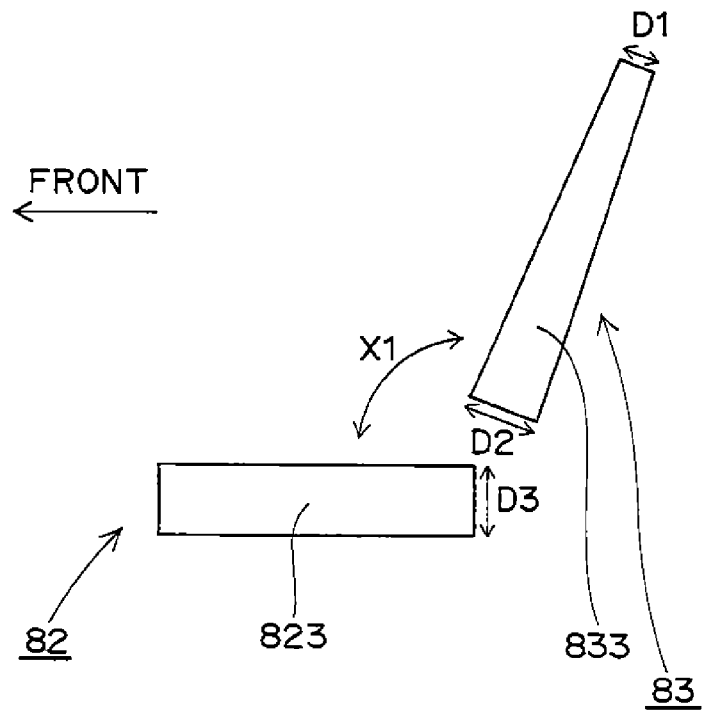
FIG. 8 is a schematic left side view of the sitting portion and the backrest portion of FIG. 2.
Figure 9:
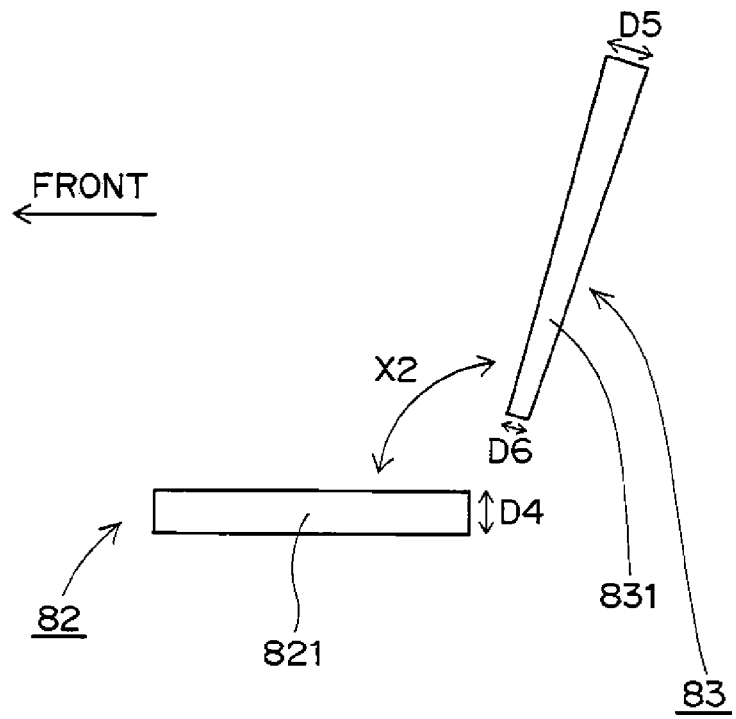
FIG. 9 is a schematic left side view of the sitting portion and the backrest portion of FIG. 7.

FIG. 8 is a schematic left side view of the sitting portion 82 and the backrest portion 83 of FIG. 2, and FIG. 9 is a schematic left side view of the sitting portion 82 and the backrest portion 83 of FIG. 7. FIG. 8 shows the third sitting region 823 and the third backrest region 833 on the left side. The backrest portion 83 is formed so that the thickness of the backrest portion 83 is different in the up-down direction, and for instance, in this embodiment, the thickness of the backrest portion 83 is larger downward. Therefore, in the third backrest region 833, a thickness D2 at the lower end thereof is formed to be larger than a thickness D1 at the upper end thereof. Likewise, although not shown in FIG. 8, in the first backrest region 831 and the second backrest region 832, the thickness at the lower end thereof is formed to be larger than the thickness at the upper end thereof.

FIG. 9 shows the state that the sitting portion 82 is attached so as to be reversed in the right-left direction from the state of FIG. 8 while being maintained in the up-down direction, and that the backrest portion 83 is attached so as to be reversed in the right-left direction from the state of FIG. 8 while being maintained in the front-rear direction. FIG. 9 shows the first sitting region 821 and the first backrest region 831 on the left side. A thickness D4 of the first sitting region 821 of FIG. 9 is smaller than a thickness D3 of the third sitting region 823 of FIG. 8. As a result, when the sitting portion 82 is attached so as to be reversed in the right-left direction, the height in the up-down direction on the left side of the sitting portion 82 is decreased.

A thickness D5 at the upper end of the first backrest region 831 of FIG. 9 is the same as the thickness at the lower end of the first backrest region 831 of FIG. 2, and a thickness D6 at the lower end of the first backrest region 831 of FIG. 9 is the same as the thickness at the upper end of the first backrest region 831 of FIG. 2. Therefore, the thickness D5 at the upper end of the first backrest region 831 of FIG. 9 is smaller than the thickness D2 at the lower end of the third backrest region 833 of FIG. 8, and the thickness D6 at the lower end of the first backrest region 831 of FIG. 9 is smaller than the thickness D1 at the upper end of the third backrest region 833 of FIG. 8. As a result, when the backrest portion 83 is attached so as to be reversed in the right-left direction, the position in the front-rear direction at the front end on the left side of the backrest portion 83 is located on the rear side.

In addition, when the backrest portion 83 is attached so as to be reversed in the right-left direction while being maintained in the front-rear direction, the backrest portion 83 is reversed in the up-down direction, so that when the thickness of the backrest portion 83 is larger downward before the backrest portion 83 is reversed, the thickness of the backrest portion 83 is smaller downward after the backrest portion 83 is reversed. Therefore, in the first backrest region 831 of FIG. 9, the thickness D5 at the upper end thereof is larger than the thickness D6 at the lower end thereof. As a result, when the backrest portion 83 is attached so as to be reversed in the right-left direction, the angle formed between the sitting portion 82 and the backrest portion 83 (the inclination angle of the backrest portion 83) is changed, and for instance, in this embodiment, the angle is changed from an angle X1 of FIG. 8 to an angle X2 of FIG. 9.

With the front seat 8 of the above embodiment, the following effects can be exhibited.

(1) The sitting portion 82 is detachable from the supporting portion 81, has the first sitting region 821, the second sitting region 822, and the third sitting region 823 which are arranged side by side in the right-left direction and have different thicknesses in the up-down direction, and can be attached to the supporting portion 81 so as to be reversed in the right-left direction while being maintained in the up-down direction. As a result, when the sitting portion 82 is attached to the supporting portion 81 so as to be reversed in the right-left direction, the height on the right and left sides of the sitting portion can be changed.

(2) The backrest portion 83 is detachable from the supporting portion 81, has the first backrest region 831, the second backrest region 832, and the third backrest region 833 which are arranged side by side in the right-left direction and have different thicknesses in the front-rear direction, and can be attached to the supporting portion 81 so as to be reversed in the right-left direction while being maintained in the front-rear direction. As a result, when the backrest portion 83 is attached to the supporting portion 81 so as to be reversed in the right-left direction, the position in the front-rear direction on the right and left sides of the backrest portion 83 can be changed.

(3) The thickness of the second sitting region 822 is formed to be larger than the thicknesses of other sitting regions 821 and 823, so that the three sitting regions can be easily sectioned in the sitting portion 82. Further, the inclining portions 82a and 82b and the projecting portions 821a and 823a are formed, so that the three sitting regions can be distinguished more easily, whereby three passengers can easily sit on the respective sitting regions.

(4) The thickness of the second backrest region 832 is formed to be larger than the thicknesses of other backrest regions 831 and 833, so that the three backrest regions can be easily sectioned in the backrest portion 83. Further, the inclining portions 83a and 83b and the projecting portions 831a and 833a are formed, so that the three backrest regions can be distinguished more easily, whereby three passengers can easily sit to the respective backrest regions.

(5) The backrest portion 83 is formed so that the thickness of the backrest portion 83 is different in the up-down direction, so that the backrest portion 83 is attached to the supporting portion 81 so as to be reversed in the right-left direction while being maintained in the front-rear direction, thereby enabling the inclination angle of the backrest portion 83 to be changed.

In the above embodiment, both the sitting portion 82 and the backrest portion 83 of the front seat 8 are detachable from the supporting portion 81, but only one of the sitting portion 82 and the backrest portion 83 may be detachable from the supporting portion 81.

In the above embodiment, the example in which the sitting portion 82 and the backrest portion 83 of the front seat 8 are detachable from the supporting portion 81 is shown, but likewise, the sitting portion 92 and the backrest portion 93 of the rear seat 9 may be detachable from the supporting portion 91, and only one of the sitting portion 92 and the backrest portion 93 of the rear seat 9 may be detachable from the supporting portion 91. Further, the sitting portion 82 or the backrest portion 83 of the front seat 8 is detachable from the supporting portion 81, so that in particular, in the driver's seat which should be comfortable to sit on, the height of the sitting portion and the position in the front-rear direction of the backrest portion can be changed.

In the above embodiment, the sitting portion 82 of the front seat 8 has the three sitting regions and the backrest portion 83 has the three backrest regions, but the number of sitting regions and the number of backrest regions are not limited to three, respectively, and may be plural. However, the number of sitting regions and the number of backrest regions coincide with each other. In addition, like the front seat 8, the rear seat 9 may have a plurality of sitting regions and a plurality of backrest regions, and in this case, the number of sitting regions and the number of backrest regions also coincide with each other. Further, the number of sitting regions and the number of backrest regions of the front seat 8 and the number of sitting regions and the number of backrest regions of the rear seat 9 may coincide with each other and may be different.

Further, in the case that an odd number of sitting regions and an odd number of backrest regions are provided, even when the sitting portion and the backrest portion are attached so as to be reversed in the right-left direction, the height of the sitting portion in the sitting region in the middle and the position in the front-rear direction of the backrest portion in the backrest region in the middle cannot be changed, but in the case that an even number of sitting regions and an even number of backrest regions are provided, when the sitting portion and the backrest portion are attached so as to be reversed in the right-left direction, the height of the sitting portion in all the sitting regions and the position in the front-rear direction of the backrest portion in all the backrest regions can be changed.

In the above embodiment, the projecting members 84 and 85 attached to the sitting portion 82 and the backrest portion 83 are inserted through the holes formed in the supporting portion 81, so that the sitting portion 82 and the backrest portion 83 are detachable from the supporting portion 81, but the detachable configuration is not limited to this, and for instance, the sitting portion 82 and the backrest portion 83 may be detachable from the supporting portion 81 by bolts, nuts, and hook-and-loop fasteners.

In the above embodiment, the example in which the sitting portion 82 and the backrest portion 83 are detachable from the supporting portion 81 is shown, but the sitting portion 82 and the backrest portion 83 may be divided into cushion portions and bottom plate portions, each of the bottom plate portions may be fixed to the supporting portion 81, and each of the cushion portions may be detachable from the corresponding bottom plate portion by hook-and-loop fasteners. In this case, the cushion portion of the sitting portion 82 is attached to the bottom plate portion of the sitting portion 82 so as to be reversed in the right-left direction while being maintained in the up-down direction, and the cushion portion of the backrest portion 83 is attached to the bottom plate portion of the backrest portion 83 so as to be reversed in the right-left direction while being maintained in the front-rear direction, so that the same effect as the above embodiment can be obtained. Further, the cushion portion of the sitting portion 82 and the cushion portion of the backrest portion 83 may be integral in the right-left direction, and may be divided in each of the sitting regions and in each of the backrest regions. When the cushion portion of the sitting portion 82 is divided in each of the sitting regions and the cushion portion of the backrest portion 83 is divided in each of the backrest regions, the cushion portions can be replaced between the sitting regions and the backrest regions. In addition, when the cushion portion of the backrest portion 83 is formed so that the thickness is different in the up-down direction, the cushion portion in one backrest region is attached to the bottom plate portion of the backrest region so as to be reversed in the right-left direction while being maintained in the front-rear direction, so that the inclination angle can be changed only in one backrest region.

In the above embodiment, the present invention has been described by taking the utility vehicle as an example, but the present invention is not limited to the utility vehicle and is applicable to all vehicles having a bench seat.

The present invention is not limited to the configuration of the above embodiment, and includes various modification examples contemplated in the scope without departing from the contents described in the claims.

What is claimed is:

1. A utility vehicle comprising:
a vehicle body, and
a seat on which a passenger sits, the seat being arranged in the vehicle body,
wherein the seat is bench-shaped and has a sitting portion, a backrest portion, and a supporting portion which supports the sitting portion and the backrest portion,
wherein at least one of the sitting portion and the backrest portion is detachable from the supporting portion,
wherein when the sitting portion is detachable, the sitting portion has a plurality of sitting regions which are arranged side by side in a right-left direction and have different thicknesses in an up-down direction,
wherein when the backrest portion is detachable, the backrest portion has a plurality of backrest regions which are arranged side by side in the right-left direction and have different thicknesses in a front-rear direction,
wherein a plurality of attaching portions are provided on a lower surface of the sitting portion, and when the sitting portion is detachable, the sitting portion can be attached to the supporting portion so as to be reversed in the right-left direction while being maintained in the up-down direction by fitting the attaching portions of the sitting portion to the supporting portion, wherein a plurality of attaching portions are provided on a rear surface of the backrest portion, and when the backrest portion is detachable, the backrest portion can be attached to the supporting portion so as to be reversed in the right-left direction while being maintained in the front-rear direction by fitting the attaching portions of the backrest portion to the supporting portion;
wherein the detachable sitting portion has three sitting regions,
wherein the thickness of the sitting region in the middle portion in the right-left direction is formed to be larger than the thicknesses of other sitting regions, and
wherein the thickness of the sitting region at one end in the right-left direction is formed to be larger than the thickness of the sitting region at the other end in the right-left direction.

2. The utility vehicle according to claim 1,
wherein the detachable backrest portion has three backrest regions,
wherein the thickness of the backrest region in the middle portion in the right-left direction is formed to be larger than the thicknesses of other backrest regions,
wherein the thickness of the backrest region at one end in the right-left direction is formed to be larger than the thickness of the backrest region at the other end in the right-left direction.

3. The utility vehicle according to claim 1,
wherein the detachable backrest portion is formed so that the thickness of the backrest portion is different in the up-down direction.

* * * * *